US012307256B1

(12) United States Patent
Duggal et al.

(10) Patent No.: US 12,307,256 B1
(45) Date of Patent: May 20, 2025

(54) LIVELOCK DETECTION AND RESOLUTION USING OLDEST OPERATION TRACKING

(71) Applicant: Apple Inc., Cupertino, CA (US)

(72) Inventors: Deepankar Duggal, Sunnyvale, CA (US); Haoyan Jia, Ellicott, MD (US); Mridul Agarwal, Sunnyvale, CA (US); Richard F. Russo, San Jose, CA (US); Debasish Chandra, Sunnyvale, CA (US); Yanran Yang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 168 days.

(21) Appl. No.: 17/526,939

(22) Filed: Nov. 15, 2021

Related U.S. Application Data

(60) Provisional application No. 63/239,268, filed on Aug. 31, 2021.

(51) Int. Cl.
G06F 9/38 (2018.01)
(52) U.S. Cl.
CPC .......... *G06F 9/3836* (2013.01); *G06F 9/3861* (2013.01)
(58) Field of Classification Search
CPC .... G06F 9/3836; G06F 9/3855; G06F 9/3861; G06F 9/524; G06F 9/3856
See application file for complete search history.

(56) References Cited

U.S. PATENT DOCUMENTS

| 5,689,713 | A  | * | 11/1997 | Normoyle | G06F 9/546 710/263 |
| 7,590,784 | B2 |   | 9/2009  | Math et al. | |
| 7,748,001 | B2 |   | 6/2010  | Burns et al. | |
| 2003/0154235 | A1 |   | 8/2003  | Sager | |
| 2004/0215933 | A1 | * | 10/2004 | Nguyen | G06F 9/3859 712/E9.06 |
| 2009/0089578 | A1 | * | 4/2009  | King | G06F 21/72 713/161 |
| 2013/0318530 | A1 | * | 11/2013 | Hooker | G06F 11/0751 718/102 |
| 2018/0276052 | A1 | * | 9/2018  | Kim | G06F 9/524 |

* cited by examiner

Primary Examiner — David J. Huisman
(74) Attorney, Agent, or Firm — Robert C. Kowert; Kowert, Hood, Munyon, Rankin & Goetzel, P.C.

(57) ABSTRACT

A livelock resolution circuit may be used to detect and remove a livelock from a processor. The livelock resolution circuit may use a counter, whose value may be reset or incremented depending on a status of a retire pointer in a reorder buffer circuit (ROB). When the retire pointer fails to move from one operation to another over a period of time, the value in the counter may continuously increment to exceed a threshold, indicating that the period of time elapses without a successful retirement of an operation from the ROB. Thus, the livelock resolution circuit may determine that a livelock occurs. To remove the livelock, the livelock resolution circuit may involve a single-step operational mode, where the livelock resolution circuit may demand only one operation (or microoperation) to be executed at each step. As a result, the operation may be retired and the livelock may be removed.

20 Claims, 12 Drawing Sheets

Computer Accessible Storage Medium 800

SOC 804

FIG. 12

LIVELOCK DETECTION AND RESOLUTION USING OLDEST OPERATION TRACKING

This application claims benefit of priority to U.S. Provisional Application Ser. No. 63/239,268, entitled "Livelock Resolution Circuit," filed Aug. 31, 2021, and which is hereby incorporated herein by reference in its entirety.

BACKGROUND

Technical Field

Embodiments described herein are related to a processor and, more particularly, to a processor including a livelock resolution circuit to detect and remove a livelock in the processor that involves multiple operations.

Description of the Related Art

Computing systems generally include one or more processors that serve as central processing units (CPUs). The CPUs execute control software (e.g., an operating system) that controls operation of various peripherals. The CPUs can also execute applications, which provide user functionality in the system. A livelock can occur in a processor when one operation continuously repeats the same interaction, without doing any useful work, in response to changes in another operation. As a result, though the involved two or more operations are not in the waiting state, they get replayed in an infinite loop where neither one makes real progress. A livelock can halt the normal operations of a processor, and thus it is desirable to have techniques for detecting and removing the livelock in a processor.

BRIEF DESCRIPTION OF THE DRAWINGS

The following detailed description refers to the accompanying drawings, which are now briefly described.

FIG. 12 is a block diagram of a computer accessible storage medium.

Figure 1:
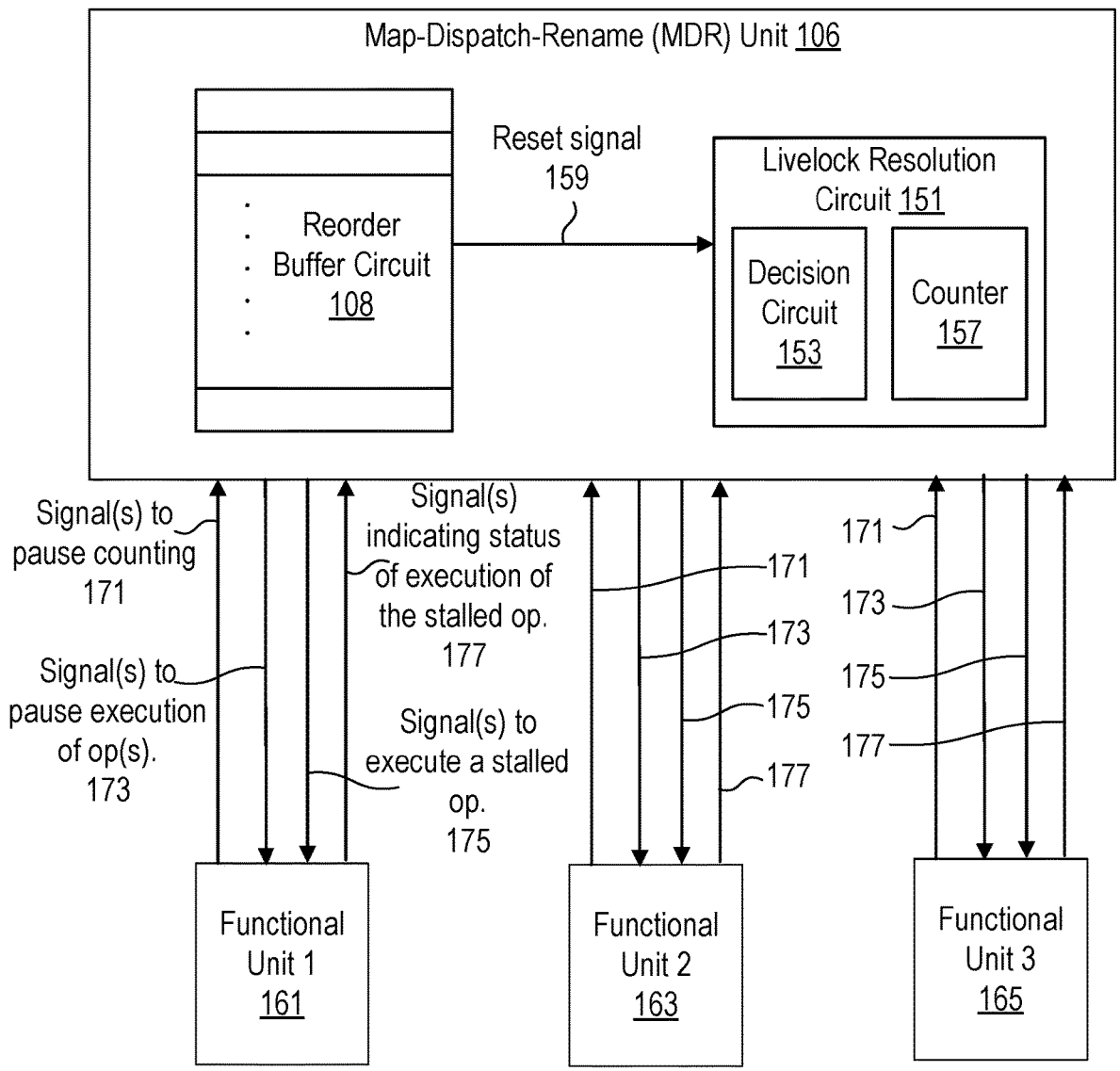
FIG. 1 is a block diagram of one embodiment of a livelock resolution circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

Turning now to FIG. 1, a block diagram of one embodiment of a portion of a processor 30 including a livelock resolution circuit 151 is shown. In the illustrated embodiment, the livelock resolution circuit 151 may be implemented as part of a map-dispatch-rename (MDR) unit 106. Alternatively, in some other embodiments, the livelock resolution circuit 151 may be implemented as a component outside the MDR unit 106.

As indicated in FIG. 1, in the illustrated embodiment, the MDR unit 106 may include a reorder buffer circuit (ROB) 108. The ROB 108 may track the state of operations in the execution pipeline of the processor 30. When an instruction of a program is decoded, it may be decoded into one or more corresponding operations or (depending on the complexity of the instruction), and a next-sequential ROB entry may be reserved in the ROB 108 (though the operations has not been executed yet) to store information for tracking the status of execution of the operations. In this disclosure, the term "instruction operation" may be more briefly referred to herein as "operation" or "op." When the execution of an operation completes, the result may first be written into the reserved ROB entry. When the reserved ROB entry becomes the oldest entry in the ROB 108, the result may be moved to a register file or memory, the operation may be retired from the ROB 108, and the content in the reserved entry may be removed from the ROB 108. Thus, the ROB 108 may use a retire pointer to track the oldest non-retired entry in the ROB 108. In other words, the retire pointer may point to the entry corresponding to the oldest operation not yet retired from the ROB 108. Once this operation retires from the ROB, the retire pointer may move to the next-sequential entry. A role of the ROB 108 is to ensure that a program can be executed out of order, but its instructions and operations may be still decoded, dispatched, and retired in order.

As described above, when a livelock occurs in the processor 30, the involved two or more operations may cause each other to be replayed in an infinite loop, where none of them can actually retire successfully from the ROB 108. As a result, if the oldest non-retired operation is one of the operations that cause the livelock, this operation cannot retire successfully from the ROB 108. Thus, based on the status of the retire pointer of the ROB 108, it may be possible to detect whether or not a livelock occurs in the processor 30.

In the illustrated embodiment, the livelock resolution circuit 151 may include a decision circuit 153 and a counter 157. The counter 157 may be configured to increment a value in the counter 157, e.g., increasing the value by one every clock cycle, during operations of the processor 30. When an operation successfully retires from the ROB 108, the retire pointer may move to the next-sequential entry, e.g., moving from the retired operation to the next oldest non-retired operation. As a result, the ROB 108 may generate a reset signal 159 to the counter 157 to reset the value to zero.

However, when a livelock occurs, the oldest non-retired operation may get stuck in the livelock and thus cannot retire successfully anymore from the ROB 108. In other words, the retire pointer of the ROB 108 may get stalled and not move from one operation to another. As a result, the ROB 108 may not generate the reset signal 159 "in time," and the value in the counter 157 may continuously increment until it exceeds a threshold. In the illustrated embodiment, since the increment of the value in the counter 157 is based on a clock, the threshold may thus represent a period of time. In other words, when the period of time elapses without a successful retirement of an operation from ROB 108, the livelock resolution circuit 151 may determine that a livelock has occurred in the processor 30. In the illustrated embodiment, the livelock resolution circuit 151 may use the decision circuit 153 to perform the determination. For example, the decision circuit 153 may be implemented using a comparator circuit, which may obtain the value in the counter 157 to compare it with the threshold to determine whether or not the value exceeds the threshold. In some other embodiments, the counter 157 may be reset to a preset non-zero value. For example, the preset non-zero value may correspond to the threshold. Accordingly, the counter 157 may count down (rather than increment) until the value in the counter 157 reaches zero, when the livelock resolution circuit 151 may determine that the period of time elapses and a livelock is detected.

For purposes of illustration, in this disclosure it is assumed that the counter 151 is an incremental counter. Once the value in the counter 157 exceeds the threshold, and a livelock is detected, the livelock resolution circuit 151 may move into the next operational stage to remove the livelock. In the livelock removal stage, the livelock resolution circuit 151 may first pause scheduling and execution of operations in the execution pipeline of processor 30. Next, the livelock resolution circuit 151 may move into a single-step mode in which it attempts to demand only the oldest non-retired operation in the ROB 108 to be executed (while still pausing the execution of other operations younger than the oldest non-retired operation). Then, the livelock resolution circuit 151 may resume the regular scheduling and execution of operations in the pipeline of the processor 30. Assuming that the oldest non-retired operation is the one of stalled operations that cause the livelock, if this operation is retired from the ROB 108, the livelock may then be cleared. Otherwise, if the livelock still exists, the livelock resolution circuit 151 may repeat the above operations to try to detect and remove the livelock again.

In the livelock removal stage, to pause the scheduling and execution of operations in the execution pipeline of processor 30, the livelock resolution circuit 151 may cause one or more signals 173 to be sent respectively to one or more functional units 161, 163, and 165 to stop the one or more functional units 161, 163, and 165 from scheduling and executing operations, as indicated in FIG. 1. Sometimes, the signals 173 may be sent directly from the livelock resolution circuit 151, or may be sent from the MDR unit 106 under the instruction of the livelock resolution circuit 151. In the illustrated embodiment, the functional units 161, 163, and 165 may include the one or more execution units 112 (in FIG. 2), e.g., an integer execution unit, a floating point execution unit, and/or a vector execution unit, and the load/store unit 118 (in FIG. 2). In addition, in the illustrated embodiment, the functional units 161, 163, and 165 may respectively include a reservation station, e.g., reservation stations 110 and 116 (in FIG. 2). In this disclosure, the reservation stations may be considered part of their respective functional units. In the illustrated embodiment, the communication between the livelock resolution circuit 151 and the functional units 161, 163, and 165 may be handled by their respective reservation stations at the side of the functional units. In other words, communication signals may be received at and/or sent from the respective reservation stations of the functional units 161, 163, and 165.

As a result of receiving the signals from the livelock resolution circuit 151, the functional units may accordingly pause their respective scheduling and execution of operations. For example, the load/store unit 118 may stop issuing any new subsequent memory load/store operations, the execution units 112 may stop the execution of operations within the individual execution units 112, and the reservation stations 110 and 116 may stop dispatching operations to the execution units 112 and load/store unit 118. In other words, the execution pipeline of the processor 30 may essentially come to a de-activated state. Since the livelock is caused by an infinite replay of two or more involved operations, the pause may at least temporarily halt the replay and stop the livelock.

In the illustrated embodiment, the load/store unit 118 may still continuously execute the load/store operations within the load/store unit 118 up to the load/store operation corresponding to the oldest non-retired operation in the ROB 108, though the load/store unit 118 pauses issuing any new subsequent load/store operations. When all the load/store operations older than the oldest non-retired operation in the ROB 108 have been executed by the load/store unit 118, the load/store unit 118 may send a signal to the livelock resolution circuit 151 to indicate the clear-out status.

Next, the livelock resolution circuit 151 may move into the single-step mode, where the livelock resolution unit 151 may demand only the oldest non-retired operation in the ROB 108 to be executed at each step. Note that in the single-step mode, only the oldest non-retired operation would be allowed to be executed, while the execution of other operations younger than the oldest non-retired operation may be still prohibited from moving forward. Since the single-step mode executes only one operation at one time, this may avoid the resumption of the livelock that involves two or more operations. Thus, when the oldest non-retired operation indicated by the retire pointer corresponds to a single operation, the livelock resolution circuit 151 may demand only this single operation to be executed. In the illustrated embodiment, the livelock resolution unit 151 may cause one or more additional signals 175 to be sent respectively to the functional units 161, 163, and 165 to execute only the oldest non-retired operation indicated by the retire pointer. Again, as described above, in the illustrated embodiment, the additional signals may be respectively sent to and received at the reservation stations (e.g., reservation stations 110 and 116) of the functional units 161, 163, and 165.

In response, the functional units 161, 163, and 165 may individually check if this operation exists within the functional units, and if so, execute the operation accordingly. In return, the livelock resolution circuit 151 may receive one or more status signals 177 respectively from the functional units 161, 163, and 165, which may indicate that (1) execution of the oldest operation is completed at a functional unit, or (2) the oldest operation does not exist in a functional unit. When the oldest operation is executed, it may then retire successfully from the ROB 108, and the livelock may be removed. Thus, the retire pointer may move sequentially to the next operation in the ROB 108. As a result, the ROB 108 may generate the reset signal 159 again to reset the counter 157 of the livelock resolution circuit 151, and operations of the processor 30 may now return to normal.

Sometimes, the oldest non-retired operation in the ROB may be a long-latency operation that is supposed to take a longer time to complete. For example, when an operation involves interactions with peripheral devices or access to an external memory, it may take a longer time to be executed. In another example, a load operation may become a long-latency operation when it misses the cache levels. A long-latency operation may not necessarily correspond to a livelock, but rather merely need a long time to complete. Sometimes, the time required to complete the long-latency operation may be longer than the period of time represented by the threshold for the counter 157. Thus, sometimes, the livelock resolution circuit 151 may receive one or more signals 171 from the functional units 161, 163, and 165 when they identify a long-latency operation. The signals 171 may pause increment [al] of the value in the counter 157. As a result, the value may not accidentally exceed the threshold while waiting for the completion of the execution of the long-latency operation, and such situations may not be erroneously detected as a livelock.

Figure 2:
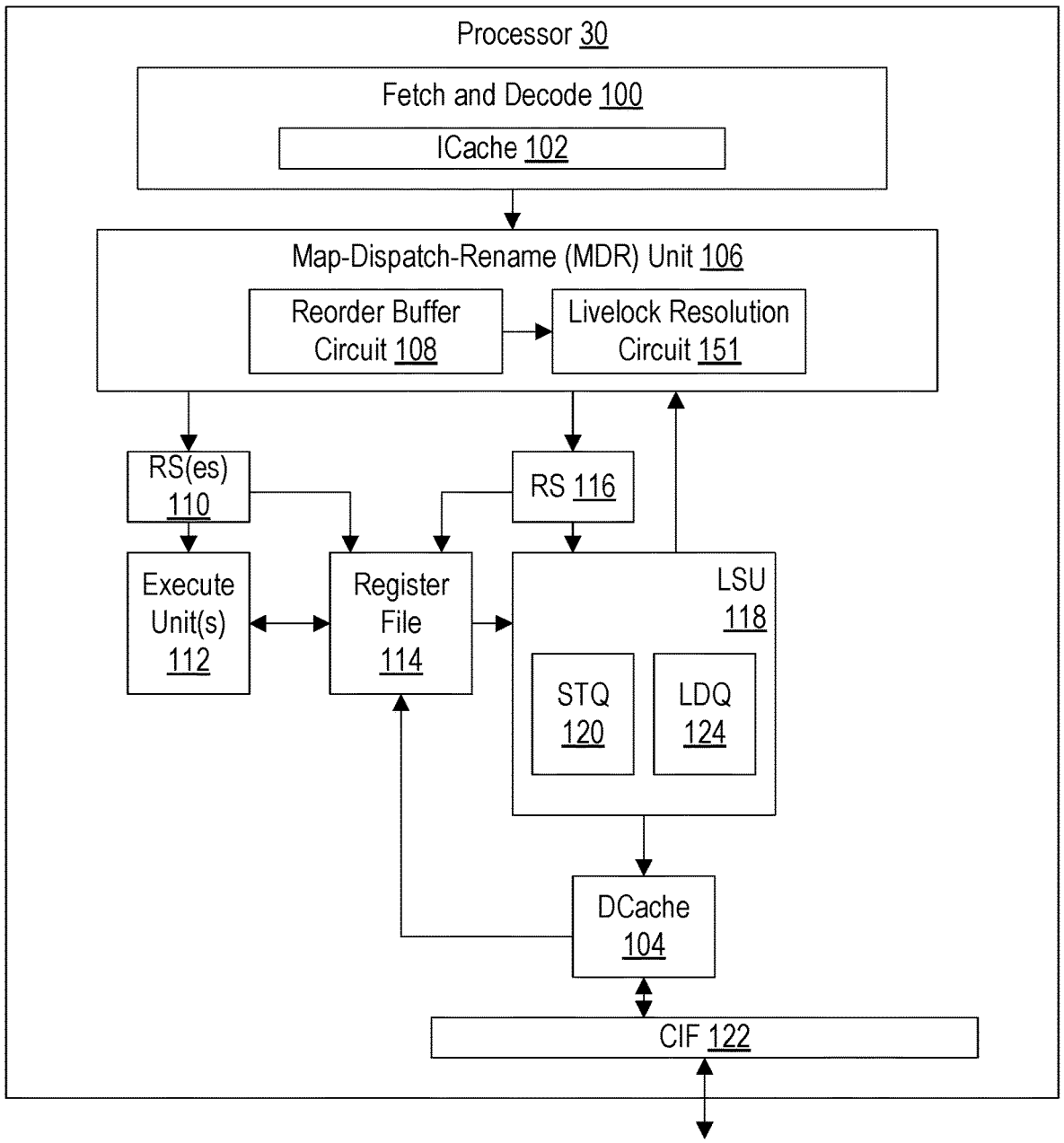
FIG. 2 is a block diagram of one embodiment of a processor including a livelock resolution circuit.

FIG. 2 is a block diagram of one embodiment of a processor 30 that includes the livelock resolution circuit 151 is shown. In the illustrated embodiment, the processor 30 includes a fetch and decode unit 100 (including an instruction cache, or ICache, 102), a map-dispatch-rename (MDR) unit 106 (including a reorder buffer circuit (ROB) 108 and a livelock resolution circuit 151, as described above), one or more reservation stations 110, one or more execute units 112, a register file 114, a data cache (DCache) 104, a load/store unit (LSU) 118, a reservation station (RS) for the load/store unit 116, and a core interface unit (CIF) 122. The fetch and decode unit 100 is coupled to the MDR unit 106, which is coupled to the reservation stations 110, the reservation station 116, and the LSU 118. The reservation stations 110 are coupled to the execution units 28. The register file 114 is coupled to the execute units 112 and the LSU 118. The LSU 118 is also coupled to the DCache 104, which is coupled to the CIF 122 and the register file 114. The LSU 118 includes a store queue 120 (STQ 120) and a load queue (LDQ 124).

The fetch and decode unit 100 may be configured to fetch instructions for execution by the processor 30 and decode the instructions into ops for execution. More particularly, the fetch and decode unit 100 may be configured to cache instructions previously fetched from memory (through the CIF 122) in the ICache 102, and may be configured to fetch a speculative path of instructions for the processor 30. The fetch and decode unit 100 may implement various prediction structures to predict the fetch path. For example, a next fetch predictor may be used to predict fetch addresses based on previously executed instructions. Branch predictors of various types may be used to verify the next fetch prediction, or may be used to predict next fetch addresses if the next fetch predictor is not used. The fetch and decode unit 100 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 30 may be decoded into a single instruction operation, and thus the instruction operation may be essentially synonymous with instruction (although it may be modified in form by the decoder). The term "instruction operation" may be more briefly referred to herein as "operation" or "op."

The MDR unit 106 may be configured to map the ops to speculative resources (e.g., physical registers) to permit out-of-order and/or speculative execution, and may dispatch the ops to the reservation stations 110 and 116. The ops may be mapped to physical registers in the register file 114 from the architectural registers used in the corresponding instructions. That is, the register file 114 may implement a set of physical registers that may be greater in number than the architectural registers specified by the instruction set architecture implemented by the processor 30. The MDR unit 106 may manage the mapping of the architectural registers to physical registers. There may be separate physical registers for different operand types (e.g., integer, media, floating point, etc.) in an embodiment. In other embodiments, the physical registers may be shared over operand types. The MDR unit 106 may also be responsible for tracking the speculative execution and retiring ops or flushing misspeculated ops. The reorder buffer 108 may be used to track the program order of ops and manage retirement/flush. That is, the reorder buffer 108 may be configured to track a plurality of instruction operations corresponding to instructions fetched by the processor and not retired by the processor. As indicated in FIG. 2, the MDR unit 106 may include the livelock resolution circuit 151, which may operate with the ROB 108 to detect and remove livelocks for the processor 30.

Ops may be scheduled for execution when the source operands for the ops are ready. In the illustrated embodiment, decentralized scheduling is used for each of the execution units 28 and the LSU 118, e.g., in reservation stations 116 and 110. Other embodiments may implement a centralized scheduler if desired.

The LSU 118 may be configured to execute load/store memory ops. Generally, a memory operation (memory op) may be an instruction operation that specifies an access to memory (although the memory access may be completed in a cache such as the DCache 104). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. In an embodiment, store ops may be executed as a store address op and a store data op. The store address op may be defined to generate the address of the store, to probe the cache for an initial hit/miss determination, and to update the store queue with the address and cache info. Thus, the store address op may have the address operands as source operands. The store data op may be defined to deliver the store data to the store queue. Thus, the store data op may not have the address operands as source operands, but may have the store data operand as a source operand. In many cases, the address operands of a store may be available before the store data operand, and thus the address may be determined and made available earlier than the store data. In some embodiments, it may be possible for the store data op to be executed before the corresponding store address op, e.g., if the store data operand is provided before one or more of the store address operands. While store ops may be executed as store address and store data ops in some embodiments, other embodiments may not implement the store address/store data split. The remainder of this disclosure will often use store address ops (and store data ops) as an example, but implementations that do not use the store address/store data optimization are also contemplated. The address generated via execution of the store address op may be referred to as an address corresponding to the store op.

Figure 6:
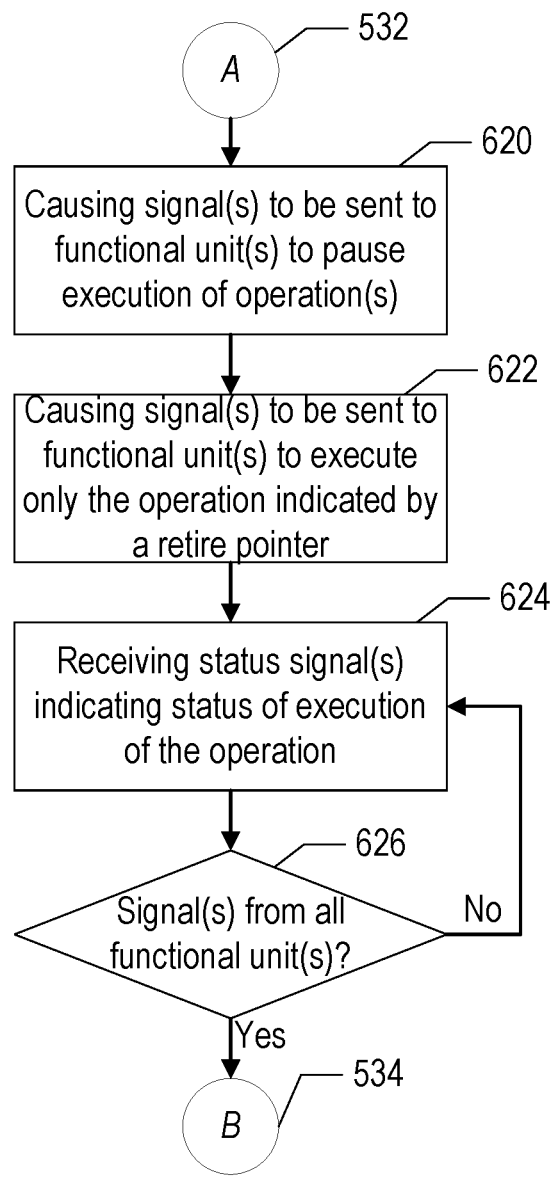
FIG. 6 is a flowchart illustrating one embodiment of operations of a livelock resolution circuit for removing a livelock.

Load/store ops may be received in the reservation station 116, which may be configured to monitor the source operands of the operations to determine when they are available and then issue the operations to the load or store pipelines, respectively. Some source operands may be available when the operations are received in the reservation station 116, which may be indicated in the data received by the reservation station 116 from the MDR unit 106 for the corresponding operation. Other operands may become available via execution of operations by other execution units 112 or even via execution of earlier load ops. The operands may be gathered by the reservation station 116, or may be read from a register file 114 upon issue from the reservation station 116 as shown in FIG. 6.

In an embodiment, the reservation station 116 may be configured to issue load/store ops out of order (from their original order in the code sequence being executed by the processor 30, referred to as "program order") as the operands become available. To ensure that there is space in the LDQ 124 or the STQ 120 for older operations that are bypassed by younger operations in the reservation station 116, the MDR unit 106 may include circuitry that preallocates LDQ 124 or STQ 120 entries to operations transmitted to the load/store unit 118. If there is not an available LDQ entry for a load being processed in the MDR unit 106, the MDR unit 106 may stall dispatch of the load op and subsequent ops in program order until one or more LDQ entries become available. Similarly, if there is not a STQ entry available for a store, the MDR unit 106 may stall op dispatch until one or more STQ entries become available. In other embodiments, the reservation station 116 may issue operations in program order and LRQ 46/STQ 120 assignment may occur at issue from the reservation station 116.

The LDQ 124 may track loads from initial execution to retirement by the LSU 118. The LDQ 124 may be responsible for ensuring the memory ordering rules are not violated (between out of order executed loads, as well as between loads and stores). If a memory ordering violation is detected, the LDQ 124 may signal a redirect for the corresponding load. A redirect may cause the processor 30 to flush the load and subsequent ops in program order, and refetch the corresponding instructions. Speculative state for the load and subsequent ops may be discarded and the ops may be refetched by the fetch and decode unit 100 and reprocessed to be executed again.

When a load/store address op is issued by the reservation station 116, the LSU 118 may be configured to generate the address accessed by the load/store, and may be configured to translate the address from an effective or virtual address created from the address operands of the load/store address op to a physical address actually used to address memory. The LSU 118 may be configured to generate an access to the DCache 104. For load operations that hit in the DCache 104, data may be speculatively forwarded from the DCache 104 to the destination operand of the load operation (e.g., a register in the register file 114), unless the address hits a preceding operation in the STQ 120 (that is, an older store in program order) or the load is replayed. The data may also be forwarded to dependent ops that were speculatively scheduled and are in the execution units 112. The execution units 112 may bypass the forwarded data in place of the data output from the register file 114, in such cases. If the store data is available for forwarding on a STQ hit, data output by the STQ 120 may forwarded instead of cache data. Cache misses and STQ hits where the data cannot be forwarded may be reasons for replay and the load data may not be forwarded in those cases. The cache hit/miss status from the DCache 104 may be logged in the STQ 120 or LDQ 124 for later processing.

The LSU 118 may implement multiple load pipelines. For example, in an embodiment, three load pipelines ("pipes") may be implemented, although more or fewer pipelines may be implemented in other embodiments. Each pipeline may execute a different load, independent and in parallel with other loads. That is, the RS 116 may issue any number of loads up to the number of load pipes in the same clock cycle. The LSU 118 may also implement one or more store pipes, and in particular may implement multiple store pipes. The number of store pipes need not equal the number of load pipes, however. In an embodiment, for example, two store pipes may be used. The reservation station 116 may issue store address ops and store data ops independently and in parallel to the store pipes. The store pipes may be coupled to the STQ 120, which may be configured to hold store operations that have been executed but have not committed.

The CIF 122 may be responsible for communicating with the rest of a system including the processor 30, on behalf of the processor 30. For example, the CIF 122 may be configured to request data for DCache 104 misses and ICache 102 misses. When the data is returned, the CIF 122 may signal the cache fill to the corresponding cache. For DCache fills, the CIF 122 may also inform the LSU 118. The LDQ 124 may attempt to schedule replayed loads that are waiting on the cache fill so that the replayed loads may forward the fill data as it is provided to the DCache 104 (referred to as a fill forward operation). If the replayed load is not successfully replayed during the fill, the replayed load may subsequently be scheduled and replayed through the DCache 104 as a cache hit. The CIF 122 may also writeback modified cache lines that have been evicted by the DCache 104, merge store data for non-cacheable stores, etc. In another example, the CIF 122 can communicate interrupt-related signals for the processor 30, e.g., interrupt requests and/or acknowledgement/non-acknowledgement signals from/to a peripheral device of the system including the processor 30.

The execution units 112 may include any types of execution units in various embodiments. For example, the execution units 112 may include integer, floating point, and/or vector execution units. Integer execution units may be configured to execute integer ops. Generally, an integer op is an op which performs a defined operation (e.g., arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g., base 2, in an embodiment).

Vector execution units may be configured to execute vector ops. Vector ops may be used, e.g., to process media data (e.g., image data such as pixels, audio data, etc.). Media processing may be characterized by performing the same processing on significant amounts of data, where each datum is a relatively small value (e.g., 8 bits, or 16 bits, compared to 32 bits to 64 bits for an integer). Thus, vector ops include single instruction-multiple data (SIMD) or vector operations on an operand that represents multiple media data.

Thus, each execution unit 112 may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of depend ops occurs based on a load op may vary based on the type of op and execution unit 28 that will be executing the op.

It is noted that any number and type of execution units 112 may be included in various embodiments, including embodiments having one execution unit and embodiments having multiple execution units.

A cache line may be the unit of allocation/deallocation in a cache. That is, the data within the cache line may be allocated/deallocated in the cache as a unit. Cache lines may vary in size (e.g., 32 bytes, 64 bytes, 128 bytes, or larger or smaller cache lines). Different caches may have different cache line sizes. The ICache 102 and DCache 104 may each be a cache having any desired capacity, cache line size, and configuration. There may be more additional levels of cache between the DCache 104/ICache 102 and the main memory, in various embodiments.

At various points, load/store operations are referred to as being younger or older than other load/store operations. A first operation may be younger than a second operation if the first operation is subsequent to the second operation in program order. Similarly, a first operation may be older than a second operation if the first operation precedes the second operation in program order.

Figure 3:
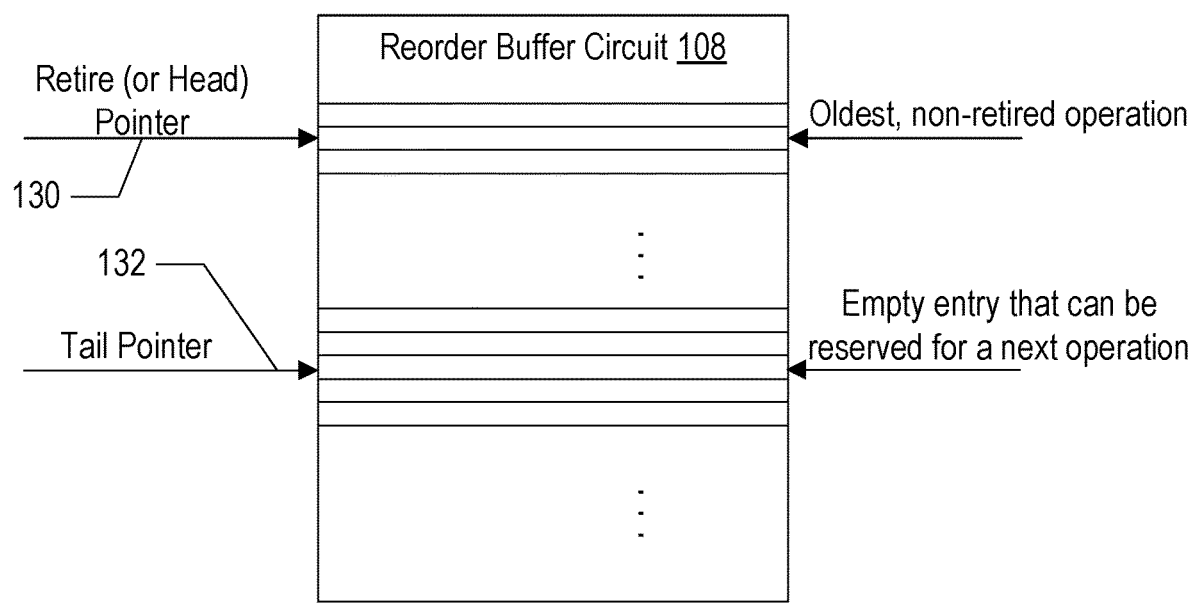
FIG. 3 is a block diagram of one embodiment of a reorder buffer circuit.

FIG. 3 is a block diagram of one embodiment of the reorder buffer circuit (ROB) 108. In the illustrated embodiment, the ROB 108 includes a plurality of entries. Each entry may correspond to an instruction, an instruction operation, or a group of instruction operations, in various embodiments. Various state related to the instruction operations may be stored in the reorder buffer (e.g., target logical and physical registers to update the architectural register map, exceptions or redirects detected during execution, etc.). Several pointers are illustrated in FIG. 3. The retire (or head) pointer 130 may point to the oldest non-retired op in the processor 30. That is, ops prior to the op at the retire pointer 130 have been retired from the reorder buffer 108, the architectural state of the processor 30 has been updated to reflect execution of the retired ops, etc. As described above, when an operation successfully retires from the ROB 108, the retire pointer 130 may move from this retired operation to the next-sequential operation in the ROB, and the content in the entry pointed to by the retired operation may be deleted from ROB 108. The content may be deleted from ROB 108 at approximately the same time as retirement of the operation or at a later time with a delay. Regardless, the retire pointer 130 may change from one operation to another to indicate the update of the retirement of the oldest operation in the ROB. The tail pointer 132 may point to the first available entry in the ROB that is still empty and thus may be reserved for a new operation. For example, when a new instruction of the program is decoded, one or more new operations may be generated. The first available entry indicated by the tail pointer 132 may be reserved and used to store content for the newly generated one or more operations.

Figure 4:
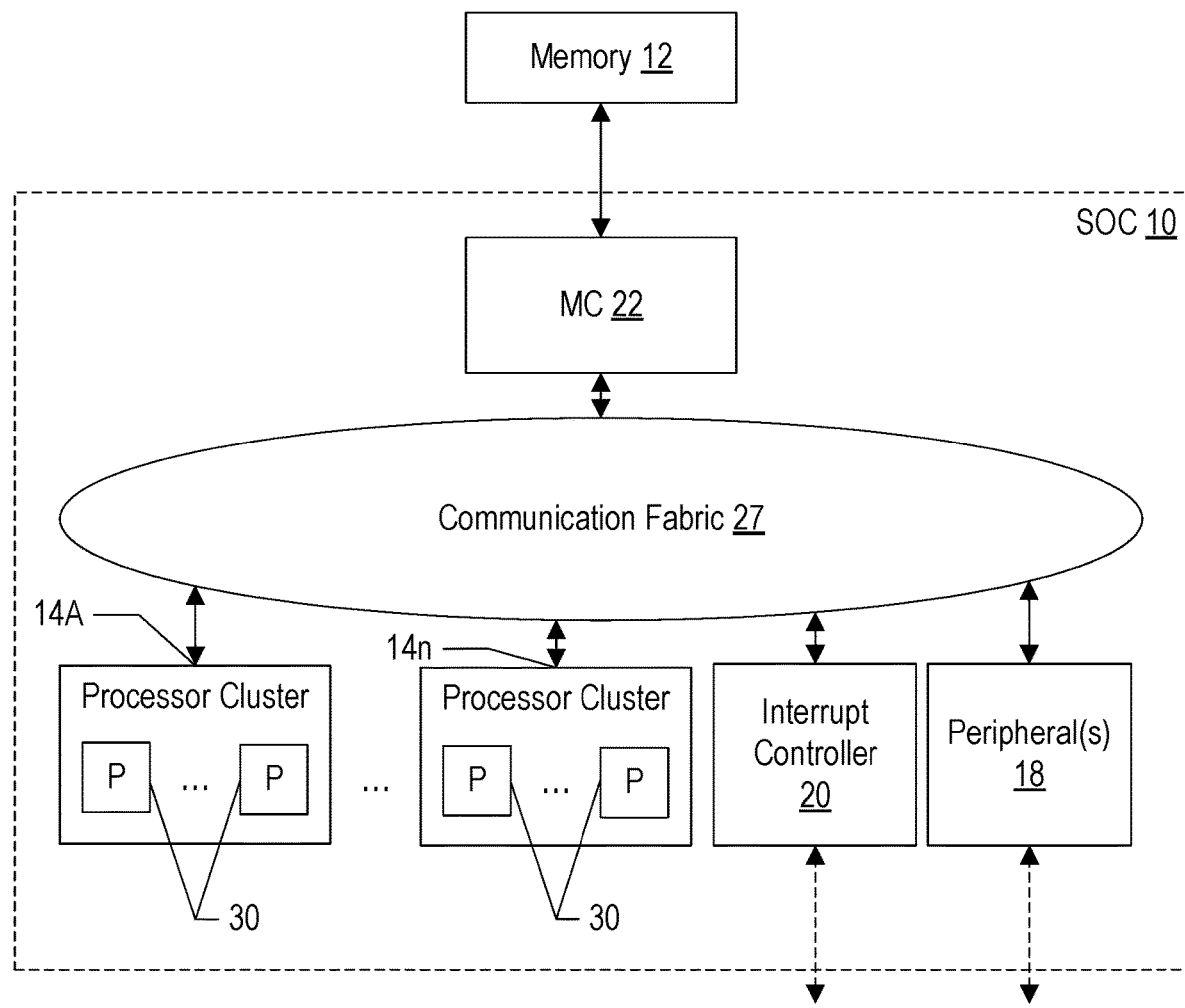
FIG. 4 is a block diagram of one embodiment of system on a chip (SOC) that may include one or more processors shown in FIG. 2.

Turning now to FIG. 4, a block diagram one embodiment of a system 10 that may include one or more processors 30 described above that may include a livelock resolution circuit 151 is shown. In the illustrated embodiment, the system 10 may be implemented as a system on a chip (SOC) 10 coupled to a memory 12. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a plurality of processor clusters 14A-14n, the interrupt controller 20, one or more peripheral components 18 (more briefly, "peripherals"), a memory controller 22, and a communication fabric 27. The components 14A-14n, 18, 20, and 22 may all be coupled to the communication fabric 27. The memory controller 22 may be coupled to the memory 12 during use. In some embodiments, there may be more than one memory controller coupled to corresponding memory. The memory address space may be mapped across the memory controllers in any desired fashion. In the illustrated embodiment, the processor clusters 14A-14n may include the respective plurality of processors (P) 30 and the respective processors (P) 30 may further include a respective livelock resolution circuit 151 as described above. As described above, each of the processors (P) 30 may include a livelock resolution circuit 151 that may detect and remove livelocks for the respective processor (P) 30. The processors 30 may form the central processing units (CPU(s)) of the SOC 10. In an embodiment, one or more processor clusters 14A-14n may not be used as CPUs.

As mentioned above, the processor clusters 14A-14n may include one or more processors 30 that may serve as the CPU of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc.

Accordingly, the processors may also be referred to as application processors. Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 22.

The peripherals 18 may be any set of additional hardware functionality included in the SOC 10. For example, the peripherals 18 may include video peripherals such as an image signal processor configured to process image capture data from a camera or other image sensor, GPUs, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SOC 10 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 4, such as the processors 30 in each processor cluster 14A-14n may vary from embodiment to embodiment. Additionally, the number of processors 30 in one processor cluster 14A-14n may differ from the number of processors 30 in another processor cluster 14A-14n. There may be more or fewer of each component/subcomponent than the number shown in FIG. 4.

Figure 5:
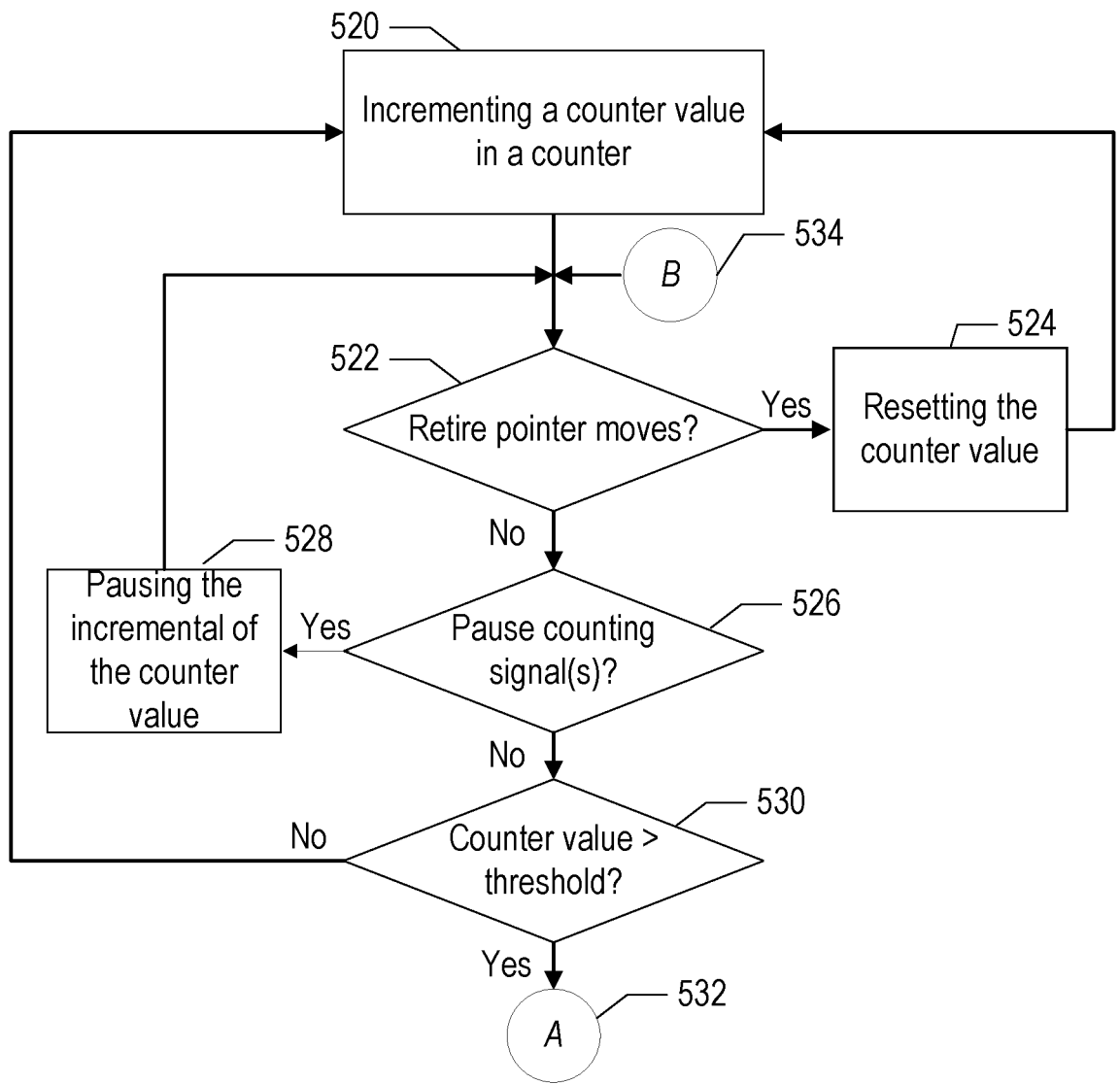
FIG. 5 is a flowchart illustrating one embodiment of operations of a livelock resolution circuit for detecting a livelock.

Turning to FIG. 5, a flowchart illustrating one embodiment of operations of the livelock resolution circuit 151 for detecting a livelock is shown. For purposes of illustration, in the illustrated embodiment, it is assumed that the counter 157 of the livelock resolution circuit 151 is an incremental counter where the value in the counter 157 increments, e.g., according to a clock (block 520). As described above, alternatively, in some other embodiments, the counter 157 may be a decremental counter where the value counts down from a preset non-zero value.

As described above, the value in the counter 157 may also depend on the status of the retire pointer of ROB 108 (block 522). For example, when the retire pointer moves from one operation to another operation, indicating that the former operation successfully retires from the ROB 108, a reset signal 159 may be generated to reset the value in the counter 157 (block 524). For example, if the counter 157 is an incremental counter, the value may be reset to zero. Otherwise, if the counter 157 is a decremental counter, the value may be reset to a preset non-zero value.

Further, as described above, in some embodiments, the oldest non-retired operation indicated by the retire pointer of ROB 108 may correspond to a long-latency operation. Thus, to avoid an erroneous livelock detection, the livelock resolution circuit 151 may receive one or more signals 171 from the functional units 161, 163, and 165 when the functional units identify a long-latency operation (block 526). In response to receiving the signals associated with the long-latency operation, the livelock circuit 151 may pause the counting of counter 157 (block 528).

If none of the above situations (e.g., reset or pause) happens, the counter 157 may continuously increment the value, and the livelock resolution circuit 151 may use a decision circuit 153 to determine whether or not the value exceeds a threshold (block 530). As described above, the threshold may represent a period of time. Thus, when the value exceeds the threshold, it may indicate that the period of time elapses without a successful retirement of an operation from ROB 108 (e.g., the retire pointer has been stalling at an entry in the ROB 108 over the period of time). In that case, the livelock resolution circuit 151 may determine that a livelock occurs, and move to the livelock removal stage (block 532) as described in detail in FIG. 6. Note that when the counter 157 is a decremental counter, the threshold may be represented by the preset non-zero value. Thus, when the value of the counter 157 counts down to zero, the livelock resolution circuit may similarly determine that the period of time lapses without a successful retirement of an operation from ROB 108 and thus a livelock occurs.

Turning to FIG. 6, a flowchart illustrating one embodiment of operations of the livelock resolution circuit 151 for removing a livelock is shown. As indicated in FIG. 6, when the livelock resolution circuit 151 determines that a livelock occurs, it may proceed to remove the livelock. In the illustrated embodiment, the livelock resolution circuit 151 may cause or instruct one or more signals 173 to be sent respectively to one or more functional units 161, 163, and 165 to stop the one or more functional units 161, 163, and 165 from scheduling and executing operations (block 620). As described above, the pause may at least temporarily stop the livelock.

In addition, in some embodiments, the load/store unit 118 may be allowed to continuously execute the load/store operations in the load/store unit 118 up to the load/store operation corresponding to the oldest non-retired operation in the ROB 108, though the load/store unit 118 is paused to issue any new subsequent load/store operations. Thus, the livelock resolution circuit 151 may receive a signal from the load/store unit 118 indicating that load/store operations older than the oldest operation indicated by the retire pointer have been executed by the load/store unit 118.

Referring back to FIG. 6, the livelock resolution circuit 151 may next move into a single-step mode, where the livelock resolution unit 151 may demand only the oldest non-retired operation in the ROB 108 to be executed. For example, the livelock resolution unit 151 may cause one or more additional signals 175 to be sent respectively to the functional units 161, 163, and 165 to execute only the oldest non-retired operation indicated by the retire pointer (block 622).

In response, the functional units 161, 163, and 165 may check if this operation exists within the functional units, and if so, execute the operation accordingly. In return, the livelock resolution circuit 151 may receive one or more status signals 177 respectively from the functional units 161, 163, and 165 indicating the status of execution of the oldest non-retired operation at the functional units (block 624). For example, the status signal from one functional unit may indicate that (1) execution of the oldest operation is completed at the functional unit, or (2) the oldest operation does not exist in the functional unit.

In the illustrated embodiment, the livelock resolution circuit 151 may also involve a waiting state to ensure that the status signals are received from all the functional units 161, 163, and 165 (block 626). For example, if the functional units include an integer execution unit, a floating point execution unit, and the load/store unit 118, the livelock resolution circuit 151 may wait to ensure that it receives all three status signals respectively from the three functional units.

When the oldest non-retired operation is executed successfully, it may now retire from the ROB 108, and the livelock may be removed. Thus, the retire pointer may move sequentially to the next operation in the ROB 108 (block 534 in FIGS. 5-6). As a result, the ROB 108 may again generate the reset signal 159 to reset the counter 157 of the livelock resolution circuit 151, and operations of the processor 30 may now return to normal.

Figure 7:
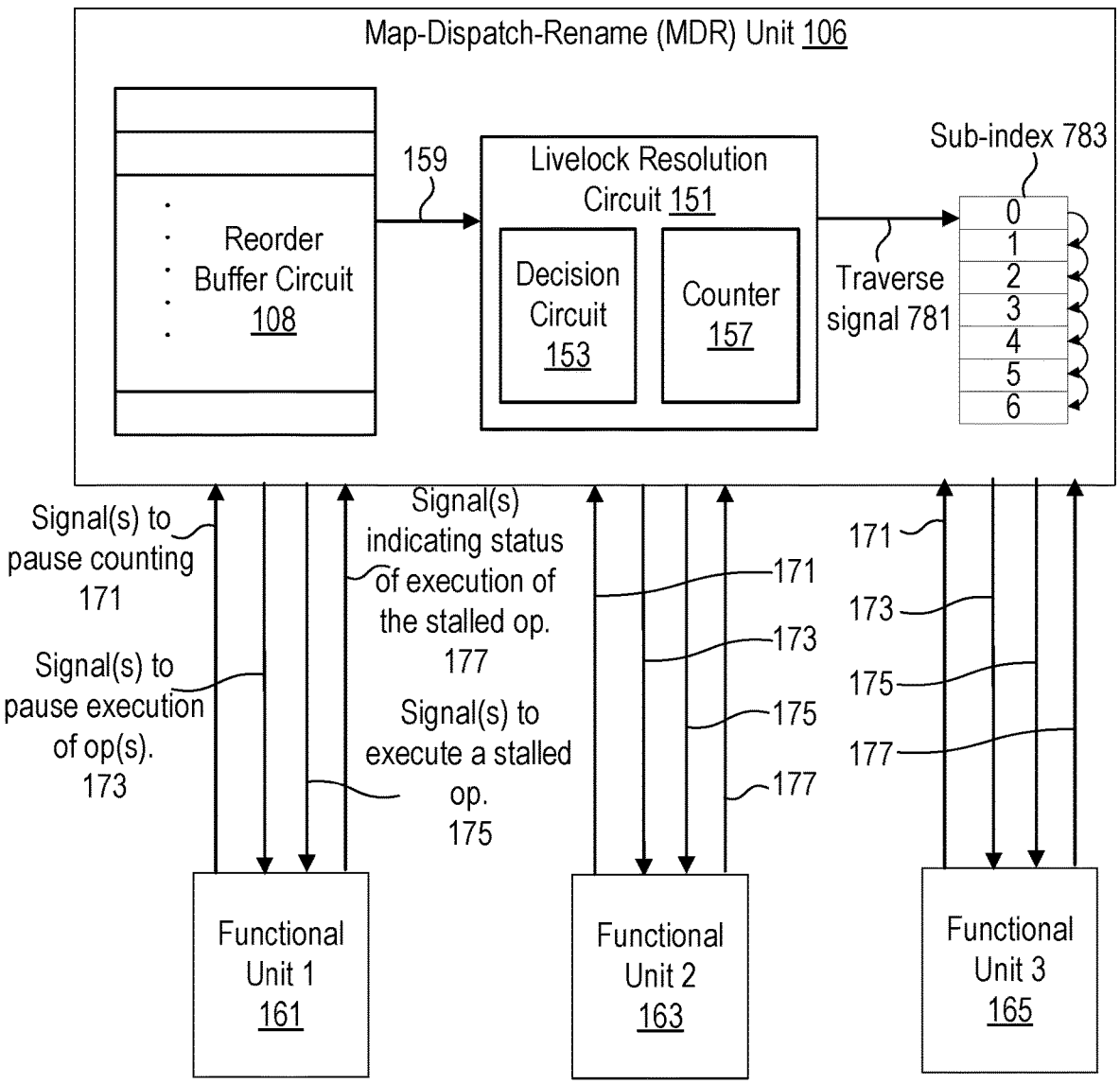
FIG. 7 is a block diagram of another embodiment of a livelock resolution circuit.

Turning to FIG. 7, a block diagram of another embodiment of a livelock resolution circuit is shown. When an instruction of a program is decoded, it may be decoded into multiple microoperations, rather than one single operation. In that case, a livelock may involve one or more of the multiple microoperations, and thus to remove the livelock, the livelock resolution circuit may need to retire all the microoperations from the ROB 108. The livelock circuit 151 may operate substantially similar to what is described above, except that it may use a sub-index 783 to perform and track execution of the individual microoperations during a single-step mode.

For purposes of illustration, it is assumed that the oldest non-retired operation indicated by the retire pointer may correspond to seven or less (≤7) microoperations. Thus, the sub-index 783 may change from 0 up to 6 to indicate the individual ones of the microoperations. Since the microoperations are indicated by the retire pointer plus the sub-index, for purposes of illustration, the sub-index 783 may be considered analogous to an "offset" to the retire pointer of the ROB 108.

The way how the livelock resolution circuit 151 detects a livelock may be substantially similar to what is described above in FIGS. 1-6. For example, the livelock resolution circuit 151 may still use a counter 157 to detect a livelock, whose value resets or increments beyond a threshold depending on whether the retire pointer of the ROB 108 moves from one operation to another operation within a period of time (represented by a threshold).

Once the value in the counter 157 exceeds the threshold and a livelock is thus detected, the livelock resolution circuit 151 may move to a single-step mode to remove the livelock. However, unlike the description above in FIGS. 1-6 that focuses on one single operation, during the single-step mode involving multiple microoperations, the livelock resolution circuit may demand only one microoperation (indicated by the retire pointer and the sub-index 783) to be executed at each step, and until after the execution of this microoperation completes, the livelock resolution unit 118 may move to demand a next microoperation to be executed. For example, when the livelock resolution circuit 151 detects a livelock, it may still cause one or more signals 173 to be sent respectively to the functional units 161, 163, and 165 to pause the scheduling and execution of operations at the functional units. Next, at each step, the livelock resolution circuit 151 may cause one or more additional signals 175 to be sent respectively to the functional units to execute only one microoperation indicated by the retire pointer and the sub-index 783. The livelock resolution circuit 151 may wait to ensure that it receives the status signals respectively from all the functional units 161, 163, and 165 indicating the status of execution of the microoperation at the functional units. For example, the status signal from a functional unit may indicate that (1) execution of the microoperation is completed at a functional unit, or (2) the microoperation does not exist in a functional unit. Until after the status signals are received from all the functional units 161, 163, and 165, the livelock resolution circuit 151 may use a traverse signal 781 to cause the sub-index to move to a next microoperation. Next, the livelock resolution circuit 151 may repeat the foregoing operations to demand only the next microoperation to be executed, until the end of the microoperations (e.g., all the microoperations are executed). As a result, the oldest non-retired operation indicated by the retire pointer (corresponding to the multiple microoperations) may now be retired from the ROB 108.

Figure 8:
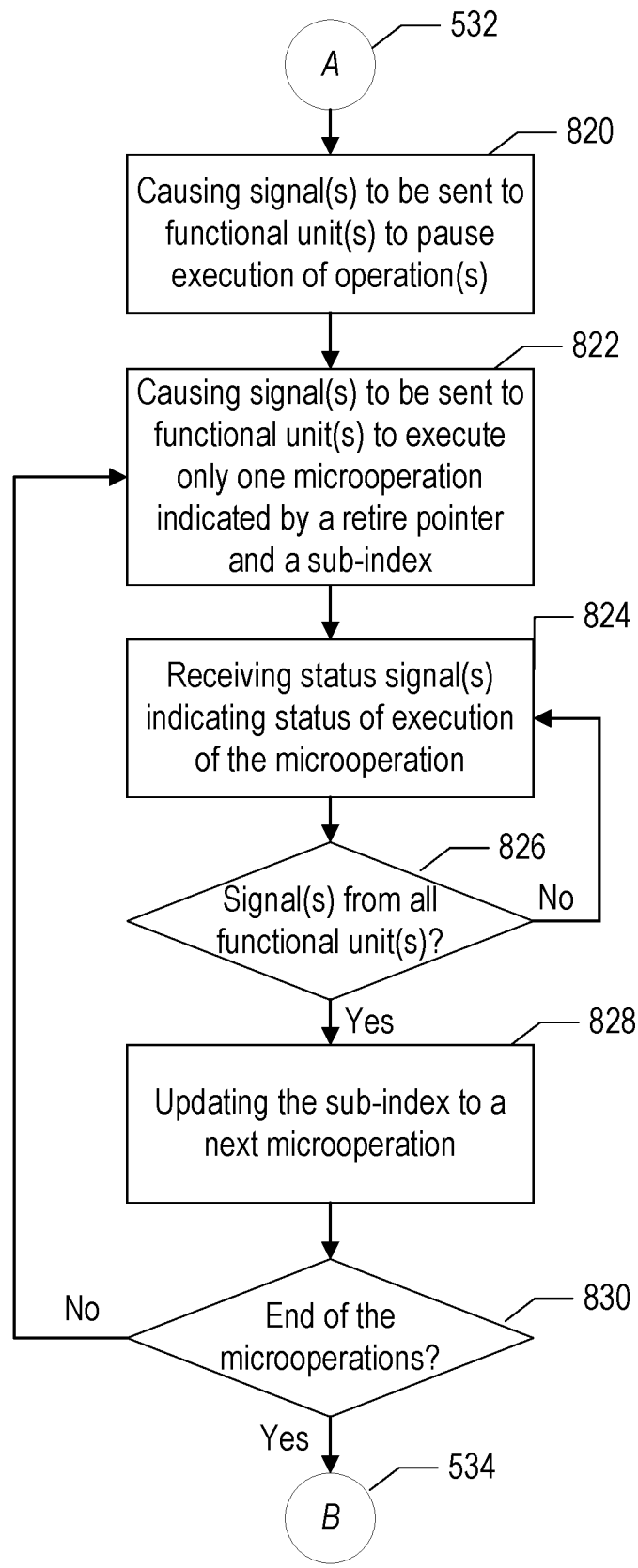
FIG. 8 is a flowchart illustrating one embodiment of operations of a livelock resolution circuit for removing a livelock.

Since operations of the livelock resolution circuit 151 for detecting a livelock may still remain substantially the same as what is described above (e.g., in FIG. 5), the following sections of the disclosure may focus on operations of the livelock resolution circuit 151 for removing a livelock (after the livelock is detected). Turning to FIG. 8, a flowchart illustrating one embodiment of operations of the livelock resolution circuit 151 for removing a livelock that involves multiple microoperations is shown. As indicated in FIG. 8, when a livelock is detected, the livelock resolution circuit 151 may cause one or more signals 173 to be sent respectively to one or more functional units 161, 163, and 165 to stop the one or more functional units 161, 163, and 165 from scheduling and executing operations (block 820).

In addition, in some embodiments, the load/store unit 118 may be allowed to continuously execute the load/store operations in the load/store unit 118 up to the load/store operation corresponding to the oldest non-retired operation indicated by the retire pointer in the ROB 108 (which corresponds to the multiple microoperations), though the load/store unit 118 is paused to issue any new subsequent load/store operations. Thus, the livelock resolution circuit 151 may receive a signal from the load/store unit 118 indicating that load/store operations older than the oldest operation indicated by the retire pointer have been executed by the load/store unit 118.

In the illustrated embodiments, the oldest non-retired operation indicated by the retire pointer of the ROB 108 may correspond to multiple microoperations. Thus, during the single-step mode, the livelock resolution 151 may demand only one microoperation in the ROB 108 to be executed at each step. For example, the livelock resolution unit 151 may cause one or more additional signals 175 to be sent respectively to the functional units 161, 163, and 165 to execute only the microoperation indicated by the retire pointer and the sub-index 783 (block 822).

In response, the functional units 161, 163, and 165 may check if this microoperation exists within the functional units, and if so, execute the microoperation accordingly. In return, the livelock resolution circuit 151 may receive one or more status signals 177 respectively from the functional units 161, 163, and 165 indicating the status of execution of the microoperation at the functional units (block 824). For example, the status signal from one functional unit may indicate that (1) execution of the microoperation is completed at the functional unit, or (2) the microoperation does not exist in the functional unit.

Further, as described above, during the single-step mode, the livelock resolution circuit 151 may wait until after the execution of one microoperation completes, and then the livelock resolution unit 118 may move to demand a next microoperation to be executed. Thus, as indicated in FIG. 8, the livelock resolution circuit 151 may involve a waiting state to ensure that the status signals are received from all the functional units 161, 163, and 165 (block 826).

If so, the livelock resolution circuit 151 may use the traverse signal 781 to cause the sub-index 783 to be updated to move to the next microoperation (block 828). In the illustrated embodiment, the livelock resolution circuit 151 may check if the sub-index 783 has reached the end of the microoperations (block 830). If not, the livelock resolution circuit 151 may repeat the foregoing operations to demand only the next microoperation to be executed by the functional units. Otherwise, the oldest non-retired operation indicated by the retire pointer (corresponding to the microoperations) may now retire from the ROB 108. Thus, the retire pointer may move sequentially to a next operation in the ROB 108 (block 534). As a result, the ROB 108 may generate the reset signal 159 to reset the counter 157 of the livelock resolution circuit 151, and operations of the processor 30 may return to normal.

Sometimes the multiple microoperations may be in an atomic group, which may require to be executed in combination as a group. In that case, the livelock resolution circuit 151 may still use a sub-index 783 to perform and track execution of the individual microoperations. But since the microoperations have to be executed in combination, the livelock resolution circuit 151 may not necessarily wait until receiving status signals for each microoperation from all the functional units 161, 163, and 165 and then move to demand execution of a next microoperation. Instead, the livelock resolution circuit 151 may demand the group of microoperations to be executed in combination (without waiting for the status signals at each step), and then receive status signals from the functional units 161, 163, and 165. Correspondingly, the functional units 161, 163, and 165 may not necessarily generate a status signal until after execution of all the microoperations. In some embodiments, when an instruction of a program is decoded, one or more indicators may be generated for the microoperations if they are deemed to belong to an atomic group. Thus, the livelock resolution circuit 151 and the functional units 161, 163, and 165 may use the indicators to guide their appropriate operations.

Figure 9:
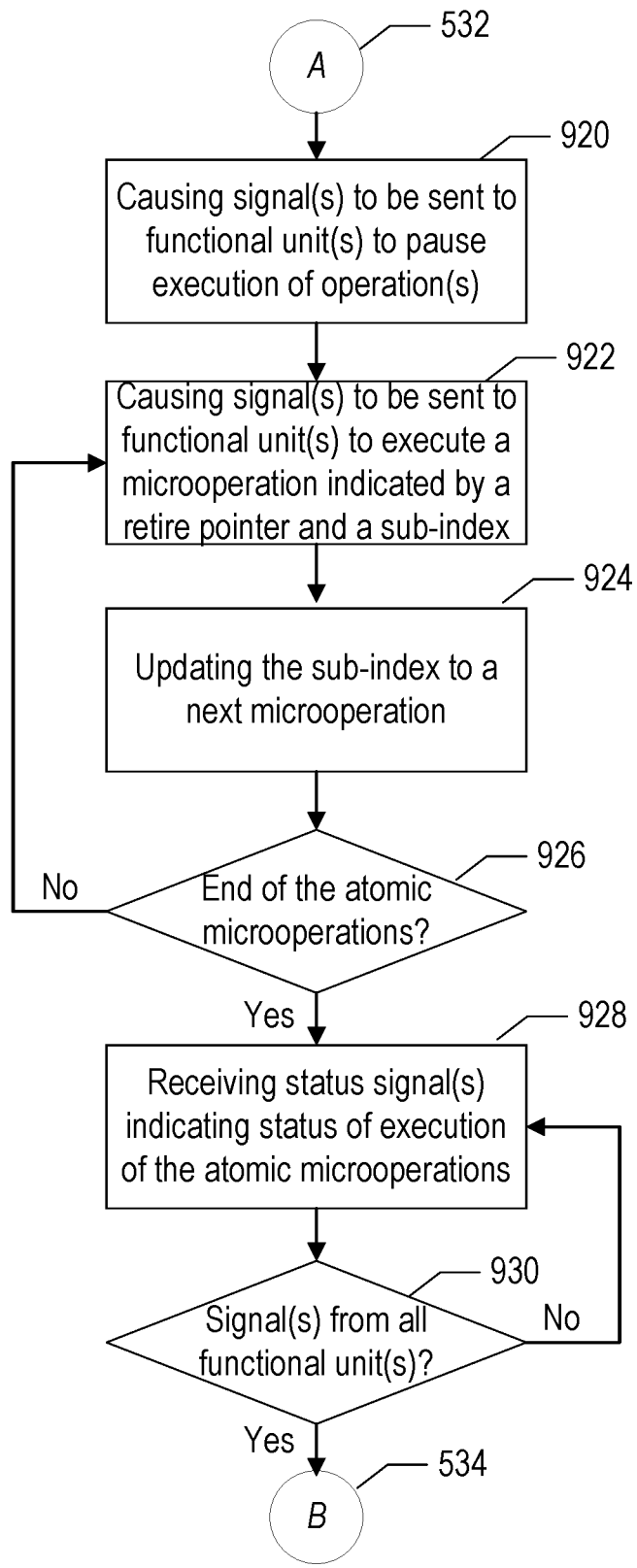
FIG. 9 is a flowchart illustrating one embodiment of operations of a livelock resolution circuit for removing a livelock.

Turning to FIG. 9, a flowchart illustrating one embodiment of operations of the livelock resolution circuit 151 for removing a livelock that involves multiple microoperations of an atomic group is shown. In the illustrated embodiment, when a livelock is detected, the livelock resolution circuit 151 may instruct one or more signals 173 to be sent respectively to one or more functional units 161, 163, and 165 to stop the one or more functional units 161, 163, and 165 from scheduling and executing operations (block 920).

In the illustrated embodiments, the oldest non-retired operation indicated by the retire pointer of the ROB 108 may correspond to multiple microoperations. During the single-step mode, the livelock resolution 151 may first demand one microoperation in the ROB 108 to be executed at each step. For example, the livelock resolution unit 151 cause one or more additional signals 175 to be sent respectively to the functional units 161, 163, and 165 to execute the microoperation indicated by the retire pointer and the sub-index 783 (block 922).

However, unlike the embodiment in FIG. 8, the microoperations in FIG. 9 may all belong to an atomic group. Thus, the livelock resolution circuit 151 may use the traverse signal 781 to update the sub-index 783 to a next microoperation in the atomic group (block 924), without waiting for status signals from the functional units. The livelock resolution circuit 151 may check if the sub-index has reached the end of the microoperations (block 926). If not, the livelock resolution circuit 151 may demand the next microoperation indicated by the retire pointer and the sub-index to be executed. For example, as described above with regards to block 922, the livelock resolution circuit 151 may cause one or more additional signals 175 to be sent respectively to the functional units 161, 163, and 165 to execute the next microoperation now indicated by the retire pointer and the updated sub-index 783.

However, if the sub-index has reached the end of the microoperations, meaning all the microoperations have been instructed to be executed, the livelock resolution circuit 151 may receive one or more status signals 177 respectively from the functional units 161, 163, and 165 indicating the status of execution of the microoperation of the atomic group (block 928). For example, the status signal from one functional unit may indicate that (1) execution of a microoperation is completed at the functional unit, or (2) the microoperation does not exist in the functional unit. Further, the livelock resolution circuit 151 may involve a waiting state to ensure that the status signals are received from all the functional units 161, 163, and 165 (block 930).

Sometimes, the oldest non-retire operation indicated by the retire pointer of the ROB 108 may correspond to an interrupt request. Thus, when the livelock resolution circuit 151 operates in the livelock removal stage, the livelock resolution circuit 151 may demand the interrupt request to be served, e.g., by the processor 30 using an interrupt controller 20. Otherwise, if the oldest non-retire operation does not correspond to an interrupt request, the livelock resolution circuit 151 may operate substantially the same as what is described above (e.g., in FIG. 6) to execute and retire the oldest operation.

Figure 10:
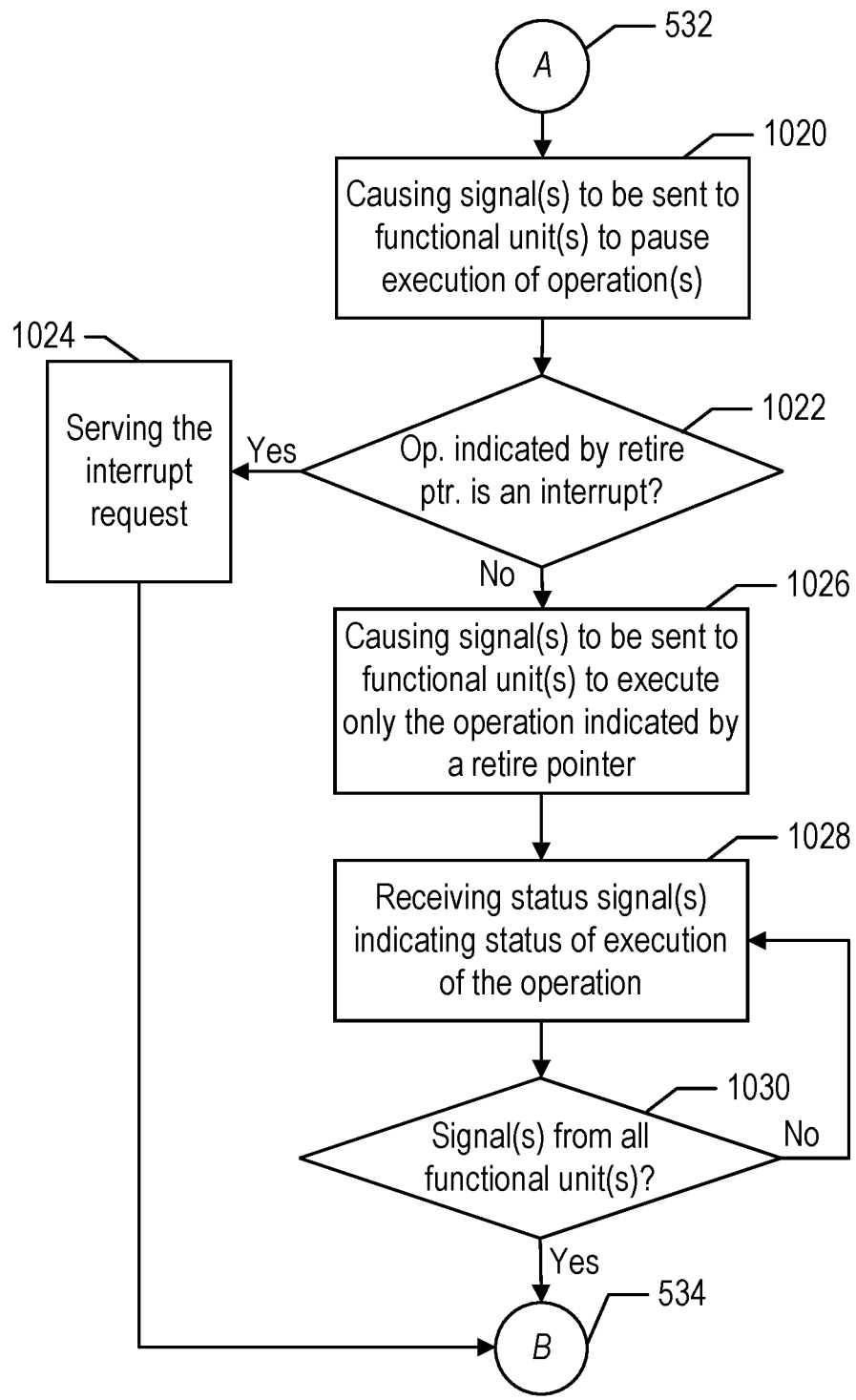
FIG. 10 is a flowchart illustrating one embodiment of operations of a livelock resolution circuit for removing a livelock.

Turning to FIG. 10, a flowchart illustrating one embodiment of operations of a livelock resolution circuit for removing a livelock involving an interrupt request is shown. As indicated in FIG. 10, when a livelock is detected, the livelock resolution circuit 151 may cause one or more signals 173 to be sent respectively to one or more functional units 161, 163, and 165 to stop the one or more functional units 161, 163, and 165 from scheduling and executing operations (block 1020).

In the illustrated embodiment, the livelock resolution circuit 151 may check if the oldest non-retired operation indicated by the retire pointer of the ROB 108 corresponds to an interrupt request (block 1022). If so, the livelock resolution circuit 151 may cause the processor 30 to serve the interrupt request (block 1024). Accordingly, the oldest non-retired operation may retire from the ROB 108 (block 534).

Otherwise, if the oldest non-retired operation indicated by the retire pointer of the ROB 108 does not correspond to an interrupt request, the livelock resolution circuit 151 may operate substantially similar as what is described above (e.g., in FIG. 6) to execute and retire the operation. For example, the livelock resolution circuit 151 may cause one or more additional signals 175 to be sent respectively to the functional units 161, 163, and 165 to execute only the oldest non-retired operation indicated by the retire pointer (block 1026).

In response, the livelock resolution circuit 151 may receive one or more status signals respectively from the functional units 161, 163, and 165 to indicate the status of the execution of the oldest non-retired operation at the functional units 161, 1634, and 165 (block 1028). Similarly, in some embodiments, the livelock resolution circuit 151 may involve a wait state to ensure that status signals are received from all the functional units 161, 163, and 165 (block 1030).

Computer System

Figure 11:
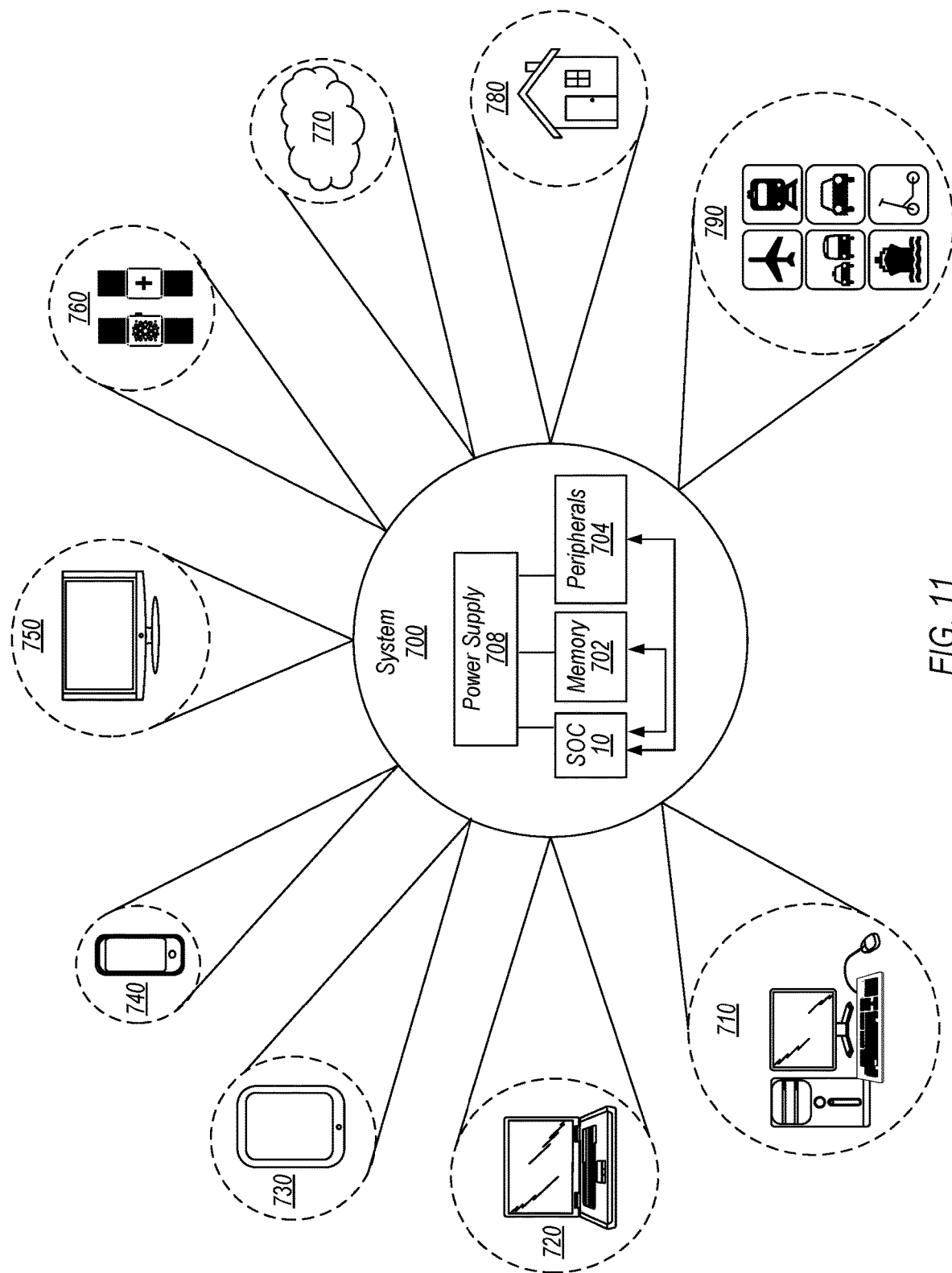
FIG. 11 is a block diagram of one embodiment of a system used in a variety of contexts.

Turning next to FIG. 11, a block diagram of one embodiment of a system 700 is shown. In the illustrated embodiment, the system 700 includes at least one instance of a system on a chip (SOC) 10 in FIG. 4 coupled to one or more peripherals 704 and an external memory 702. As described above, the SOC 10 may include one or more processors (P) 30 which may individually include a livelock resolution circuit 151 for detecting and removing livelocks for the respective processor (P) 30. A power supply (PMU) 708 is provided which supplies the supply voltages to the SOC 10 as well as one or more supply voltages to the memory 702 and/or the peripherals 154. In some embodiments, more than one instance of the SOC 10 (e.g., the SOCs 10A-10*q*) may be included (and more than one memory 702 may be included as well). The memory 702 may include the memory 12 illustrated in FIG. 4, in an embodiment.

The peripherals 704 may include any desired circuitry, depending on the type of system 700. For example, in one embodiment, the system 704 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 10 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home 780 may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 11 is the application of system 700 to various modes of transportation 790. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 11 are illustrative only and are not intended to be limiting. Other devices are possible and are contemplated.

Computer Readable Storage Medium

Turning now to FIG. 12, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 12 may store a database 804 representative of the SOC 10 in FIG. 4. As described above, the SOC 10 may include one or more processors (P) 30 that may individually include a livelock resolution circuit 151 for detecting and removing livelocks for the respective processor (P) 30. Generally, the database 804 may be a database which can be read by a program and used, directly or indirectly, to fabricate the hardware comprising the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 804 on the computer accessible storage medium 800 may be the netlist (with or without the synthesis library) or the data set, as desired.

While the computer accessible storage medium 800 stores a representation of the SOC 10, other embodiments may carry a representation of any portion of the SOC 10, as desired, including any subset of the components shown in FIG. 4. The database 804 may represent any portion of the above.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . . W, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A processor, comprising:
    a reorder buffer circuit configured to track a plurality of operations and to provide a retire pointer indicating an oldest operation of the plurality of operations that has not been retired from the reorder buffer circuit;
    a plurality of functional unit circuits individually configured to independently execute respective operations of the plurality of operations tracked in the reorder buffer circuit; and
    a livelock resolution circuit comprising a counter configured to reset when the oldest operation indicated by the retire pointer of the reorder buffer circuit changes from one operation to another operation, wherein the livelock resolution circuit is configured to:
        determine if a value in the counter of the livelock resolution circuit exceeds a threshold value; and
        responsive to a determination that the value in the counter exceeds the threshold value:
            cause a plurality of stop signals to be sent respectively to the plurality of functional unit circuits to stop the plurality of functional unit circuits from executing operations; and
            cause a particular signal to be sent to a first functional unit circuit of the stopped plurality of functional unit circuits to execute only the oldest operation indicated by the retire pointer of the reorder buffer circuit.

2. The processor of claim 1, wherein the livelock resolution circuit is further configured to:
    receive one or more status signals respectively from the plurality of functional unit circuits indicating status of execution of the oldest operation indicated by the retire pointer at the plurality of functional unit circuits.

3. The processor of claim 2, wherein one of the one or more status signals received from one of the plurality of functional unit circuits indicates that (1) execution of the oldest operation is completed at the one of the plurality of functional unit circuits, or (2) the oldest operation does not exist in the one of the plurality of functional unit circuits.

4. The processor of claim 1, wherein the oldest operation indicated by the retire pointer corresponds to a plurality of microoperations, wherein the particular signal is one of a plurality of signals including a first signal and a second signal, and wherein the livelock resolution circuit is further configured to:
    identify a first microoperation of the plurality of microoperations that is indicated by the retire pointer and a sub-index;
    cause the first signal to be sent to the first functional unit circuit to execute the identified first microoperation;
    receive a status signal from the first functional unit circuit indicating status of execution of the identified first microoperation at the first functional unit circuit;
    update the sub-index;
    identify a second microoperation of the plurality of microoperations that is indicated by the retire pointer and the updated sub-index; and cause the second signal to be sent to a second functional unit circuit of the plurality of functional unit circuits to execute the second microoperation.

5. The processor of claim 1, wherein the oldest operation indicated by the retire pointer corresponds to a plurality of microoperations to be executed in combination, and wherein the livelock resolution circuit is further configured to:
identify a microoperation of the plurality of microoperations that is indicated by the retire pointer and a sub-index;
cause the particular signal to be sent to the first functional unit circuit to execute the identified microoperation;
update the sub-index;
identify one or more additional microoperations of the plurality of microoperations indicated by the retire pointer and the updated sub-index;
cause one or more additional signals to be sent respectively to at least a portion of the plurality of functional unit circuits to execute the one or more additional microoperations; and
until after an additional signal of the one or more additional signals is sent to a second functional unit circuit of the plurality of functional unit circuits to execute a last one of the one or more additional microoperations, receive one or more status signals respectively from the at least a portion of the plurality of functional unit circuits indicating status of execution of the one or more additional microoperations at the at least a portion of the plurality of functional unit circuits.

6. The processor of claim 1, wherein the plurality of functional unit circuits comprise an integer execution unit, a floating point execution unit, and a load/store unit, wherein individual ones of the plurality of functional unit circuits include a reservation station, and wherein the plurality of stop signals sent respectively to the plurality of functional unit circuits to stop the plurality of functional unit circuits from executing operations and the particular signal sent to the first functional unit circuit to execute only the oldest operation are sent to respective reservation stations of the individual ones of the plurality of functional unit circuits.

7. The processor of claim 1, wherein the livelock resolution circuit is further configured to:
increment the value in the counter of the livelock resolution circuit;
receive at least one signal from at least one of the plurality of functional unit circuits to pause the increment of the value in the counter; and
responsive to receiving the at least one signal, pause the increment of the value in the counter.

8. The processor of claim 7, wherein the at least one signal indicates that an operation of the plurality of operations tracked in the reorder buffer circuit requires time to be executed that is longer than a specified duration of time.

9. The processor of claim 1, wherein the oldest operation indicated by the retire pointer corresponds to an interrupt request, and wherein the processor is configured to serve the interrupt request.

10. The processor of claim 1, wherein the livelock resolution circuit is further configured to:
prior to causing the particular signal to be sent to the first functional unit circuit to execute only the oldest operation, receive a signal from one of the plurality of functional unit circuits indicating that load/store operations older than the oldest operation indicated by the retire pointer of the reorder buffer circuit have been executed at the one of the plurality of functional unit circuits.

11. A method, comprising:
determining, using a livelock resolution circuit, if a value in a counter of the livelock resolution circuit exceeds a threshold value, wherein the value in the counter of the livelock resolution circuit resets to zero when a retire pointer of a reorder buffer circuit indicating an oldest operation moves from one operation to another operation; and
in response to determining that the value in the counter exceeds the threshold value:
instructing, by the livelock resolution circuit, a plurality of stop signals to be sent respectively to a plurality of functional unit circuits to stop the plurality of functional unit circuits from executing operations; and
instructing, by the livelock resolution circuit, a particular signal to be sent to a first functional unit circuit of the stopped plurality of functional unit circuits to execute only the oldest operation indicated by the retire pointer of the reorder buffer circuit.

12. The method of claim 11, further comprising:
receiving, at the livelock resolution circuit, a status signal from the first functional unit circuit indicating status of execution of the oldest operation indicated by the retire pointer at the first functional unit circuit.

13. The method of claim 12, wherein the status signal received from the first functional unit circuit indicates that (1) execution of the oldest operation is completed at the first functional unit circuit, or (2) the oldest operation does not exist in the first functional unit circuit.

14. The method of claim 11, wherein the oldest operation indicated by the retire pointer corresponds to a plurality of microoperations, wherein the particular signal is one of a plurality of signals including a first signal and a second signal, and wherein the method further comprises:
identifying a first microoperation of the plurality of microoperations that is indicated by the retire pointer and a sub-index;
instructing the first signal to be sent to the first functional unit circuit to execute the identified first microoperation;
receiving a status signal from the first functional unit circuit indicating status of execution of the identified first microoperation at the first functional unit circuit;
incrementing the sub-index;
identifying a second microoperation of the plurality of microoperations that is indicated by the retire pointer and the incremented sub-index; and
instructing the second signal to be sent to a second functional unit circuit of the plurality of functional unit circuits to execute the second microoperation.

15. The method of claim 11, wherein the oldest operation indicated by the retire pointer corresponds to a plurality of microoperations to be executed in combination, and wherein the method further comprises:
identifying a microoperation of the plurality of microoperations that is indicated by the retire pointer and a sub-index;
instructing the particular signal to be sent to the first functional unit circuit to execute the identified microoperation;
incrementing the sub-index;
identifying one or more additional microoperations of the plurality of microoperations indicated by the retire pointer and the incremented sub-index;
instructing one or more additional signals to be sent respectively to at least a portion of the plurality of functional unit circuits to execute the one or more additional microoperations; and until after an additional signal of the one or more additional signals is sent to a second functional unit circuit of the plurality of functional unit circuits to execute a last one of the plurality of microoperations, receiving one or more status signals respectively from the at least a portion of the plurality of functional unit circuits indicating status of execution of the one or more additional microoperations at the at least a portion of the plurality of functional unit circuits.

16. The method of claim 11, wherein the plurality of functional unit circuits include an integer execution unit, a floating point execution unit, and a load/store unit, wherein individual ones of the plurality of functional unit circuits, including the first functional unit circuit, include a reservation station, wherein the plurality of stop signals sent respectively to the plurality of functional unit circuits to stop the plurality of functional unit circuits from executing operations are sent respectively to respective reservation stations of the individual ones of the plurality of functional unit circuits, and wherein the particular signal sent to the first functional unit circuit to execute only the oldest operation is sent to the reservation station of the first functional unit circuit.

17. The method of claim 11, further comprising:

incrementing the value in the counter of the livelock resolution circuit;

receiving at least one signal from at least one of the plurality of functional unit circuits to pause the incrementing of the value in the counter; and in response to receiving the at least one signal, pausing the incrementing of the value in the counter.

18. The method of claim 11, further comprising:

prior to instructing the particular signal to be sent to the first functional unit circuit to execute only the oldest operation, receiving a signal from one of the plurality of functional unit circuits indicating that load/store operations older than the oldest operation indicated by the retire pointer of the reorder buffer circuit have been executed at the one of the plurality of functional unit circuits.

19. A system, comprising:

a processor comprising:

a reorder buffer circuit configured to track a plurality of operations and to provide a retire pointer indicating an oldest operation of the plurality of operations that has not been retired from the reorder buffer circuit;

a plurality of functional unit circuits individually configured to independently execute respective operations of the plurality of operations tracked in the reorder buffer circuit; and a livelock resolution circuit comprising a counter configured to reset when the oldest operation indicated by the retire pointer of the reorder buffer circuit changes from one operation to another operation, wherein the livelock resolution circuit is configured to:

determine if a value in the counter of the livelock resolution circuit exceeds a threshold value; and responsive to a determination that the value in the counter exceeds the threshold value:

cause a plurality of stop signals to be sent respectively to the plurality of functional unit circuits to stop the plurality of functional unit circuits from executing operations; and cause a first signal to be sent to a first functional unit circuit of the stopped plurality of functional unit circuits to execute only the oldest operation indicated by the retire pointer of the reorder buffer circuit; and receive a status signal from the first functional unit circuit indicating status of execution of the oldest operation indicated by the retire pointer at the first functional unit circuit.

20. The system of claim 19, wherein the oldest operation indicated by the retire pointer corresponds to a plurality of microoperations, and wherein to cause the first signal to be sent to the first functional unit circuit to execute only the oldest operation, the livelock resolution circuit is configured to:

identify one of the plurality of microoperations that is indicated by the retire pointer and a sub-index;

cause the first signal to be sent to the first functional unit circuit to execute the identified microoperation;

receive a status signal from the first functional unit circuit indicating status of execution of the identified microoperation at the first functional unit circuit;

update the sub-index;

identify a next microoperation of the plurality of microoperations that is indicated by the retire pointer and the updated sub-index; and cause an additional signal to be sent to another functional unit circuit to execute the next microoperation.

* * * * *